Patented June 8, 1948

2,443,172

UNITED STATES PATENT OFFICE 2,443,172

CULTURE OF PENICILLIUM MOLDS

Eric R. Woodward, New York, N. Y., assignor to Mathieson Chemical Corporation, a corporation of Virginia No Drawing. Application March 27, 1946, Serial No. 657,608

7 Claims. (Cl. 195—77)

The present invention relates to improvements in the production of penicillin.

Penicillin is a secretion of a particular mold or type of mold. It is obtained primarily from molds of the penicillium type, notably the *Penicillium notatum*, and is of proven value in the treatment of various infections.

In spite of a great demand for penicillin, and extensive research work for increasing yield and purity, the processes involved in its production are tedious and exacting, and the yields relatively low, compared with a large amount of mold growth required to produce it.

A further primary problem involved in the production of penicillin is its extreme susceptibility to contamination. The optimum condition for the mold growth involves temperatures and cultures favorable to the growth of numerous stray micro-organisms which would contaminate the culture.

The condition is aggravated by the fact that penicillium molds are aerobic, that is, they require oxygen for their growth, and where the oxygen is supplied by air there is a constant danger of contamination from that source. Even where the air coming in contact with the culture has been sterilized by conventional methods, contamination of the culture may result.

Penicillium molds belong to the familiar blue or green mold family, commonly found on citrus fruits, bread, and other foods. It has been found that molds of this type are generally destroyed or their growth inhibited by treatment with chlorine dioxide. I have discovered, however, that contrary to this general experience, the yield of penicillin from penicillium molds, for instance *Penicillium notatum*, may be materially increased by subjecting the culture inoculated with the mold to a treatment with chlorine dioxide at concentrations within the herein specified ranges.

I cannot at present account for this peculiar effect of chlorine dioxide on the penicillium mold culture. The chlorine dioxide, in concentrations hereinafter described, appears actually to stimulate the growth of the penicillium mold. It may be that this stimulating effect is due to a selective activity of the chlorine dioxide in destroying or inhibiting the growth of other micro-organisms which are natural enemies of the penicillium mold and tend to destroy or otherwise compete with the desirable mold growth.

Predicated upon my discovery, the present invention comprises the treatment of the inoculated culture of conventional type with chlorine dioxide. The chlorine dioxide is advantageously supplied in admixture with the air ordinarily supplied to support the growth of the aerobic mold. It may, however, be supplied in dilution with an inert gas other than air so long as the necessary oxygen to support growth of the mold is also supplied.

Chlorine dioxide in concentrated form is a highly explosive gas and for safe handling must be diluted with a gas, air for instance, which is inert with respect to the chlorine dioxide. Mixtures of chlorine dioxide in which the partial pressure of the chlorine dioxide does not exceed 30 mm. of mercury may be safely handled with ordinary precaution. A mixture of chlorine dioxide and air in which the partial pressure of the chlorine dioxide is 30 mm. of mercury will result from the mixing of about 40,000 P. P. M. of chlorine dioxide with air.

However, for the purpose of my present invention, the concentration of the chlorine dioxide should be maintained at such value as to be effective in a speeding up of the growth of the mold, but must not exceed that at which the culture is killed.

I have found that a concentration of chlorine dioxide in the culture of 93 P. P. M. or less neither materially aids nor hinders the mold growth. On the other hand, a concentration of chlorine dioxide in the culture of 6300 P. P. M. has been found to have a tendency to kill off the desired mold growth.

The optimum concentration of chlorine dioxide within these extreme limits appears to depend to a considerable extent upon the amount and kind of interfering bacteria, and upon the length of the period of treatment.

It is not necessary to continue the treatment throughout the period of growth of the mold. A treatment of short duration during the early part of the growth period has been found effective to stimulate the mold growth for a period of several days.

The presently preferred method of carrying out the treatment is to pass the chlorine dioxide in admixture with air in contact with the inoculated culture. It is not necessary that the chlorine dioxide be injected into the liquid. Where the chlorine dioxide is present in the atmosphere of air above the surface of the culture, it appears that effective amounts of the chlorine dioxide are absorbed by the culture with the oxygen of the air.

The concentration of the chlorine dioxide in the air thus supplied should usually be within the range of about 500 to 5000 P. P. M.. Concentrations within the range of about 1000 to 4000 P. P. M. have been found to be particularly advantageous. The optimum concentration within the specified ranges is dependent upon the time of contact and the amount and kind of contaminants. By correlation of the concentration and time of contact, concentrations of chlorine dioxide within these ranges may be used with advantage. The concentration of chlorine dioxide built up in the culture will depend upon the concentration of chlorine dioxide in the air, the period of time during which the chlorine dioxide is thus admixed with the air supplied to the culture, and the rate at which the chlorine dioxide is dissipated by the particular culture. Optimum treating conditions under any specific operation may be readily determined by simple tests.

It will be understood that air is continuously supplied to the culture but the chlorine dioxide need be included in the air for only a brief period, say about 3 to 5 minutes at the beginning of the growth period. Where long growth periods are employed, the chlorine dioxide treatment may be repeated at intervals, say once every two days.

The improvement attained according to the present invention appears to be independent of the particular culture medium or broth used. A culture broth conventionally used for the purpose is produced by steeping corn in water, and such has been used with advantage in accordance with the present invention.

The invention will be further illustrated by the following specific examples of its application to small laboratory scale operation. For comparative purposes there is included a test which was carried out under conditions comparable with the tests made in accordance with the present invention, except that the chlorine dioxide treatment was omitted.

Example 1

For comparative purposes a 150 cc. sample of a conventional culture broth of corn steep liquor inoculated with *Penicillium notatum* was placed in a 500 cc. Erlenmeyer flask equipped with an air inlet tube and an air outlet tube passing through a wadding of cotton closing the neck of the flask. The flask was placed on a shaker and air was introduced through the air inlet tube. The flask was maintained at a temperature of about 25° C. for a period of 48 hours with constant shaking. At the end of this incubation period it was found that the amount of penicillin generated in this small scale laboratory operation was 10 Oxford units per cc.

Example 2

The operation of Example 1 was repeated under identical conditions except that for a period of 3 minutes at the beginning of the incubation period, chlorine dioxide was supplied to the flask in admixture with the air. The concentration of the chlorine dioxide in the chlorine dioxide-air mixture was 2470 P. P. M., equivalent to a chlorine dioxide partial pressure of 1.88 mm. of mercury. The amount of chlorine dioxide thus supplied to the flask was equivalent to about 0.15% based on the weight of the culture broth. At the end of the 3-minute period, the introduction of chlorine dioxide to the flask was discontinued. At the end of a 24-hour incubation period, the concentration of penicillin in the broth was found to be 23 Oxford units per cc. and at the end of 48 hours the concentration had increased to 31 Oxford units per cc., as compared with 10 Oxford units per cc. for Example 1 in which the chlorine dioxide treatment was omitted.

Example 3

The test of Example 2 was repeated except that the concentration of chlorine dioxide in the chlorine dioxide-air mixture introduced into the flask was 3290 P. P. M., the partial pressure of the chlorine dioxide in the mixture being about 2.5 mm. of mercury. The amount of chlorine dioxide passed through the flask over the 3-minute period was 0.20% based on the weight of the culture broth. In this run results substantially identical with those of Example 2 were obtained.

Example 4

The test of Example 2 was repeated under identical conditions except that the chlorine dioxide-air mixture was supplied to the flask over a period of 5 minutes and was of a higher concentration. In this test the partial pressure of the chlorine dioxide in the mixture was between 4 and 5 mm. of mercury, and the total amount of chlorine dioxide passed to the flask was 0.37% based on the weight of the culture broth. In this operation the treatment resulted in the killing of the mold culture due to the high chlorine dioxide concentration.

A chlorine dioxide mixture in which the partial pressure of the chlorine dioxide is 4 mm. of mercury contains in excess of 5000 P. P. M. of chlorine dioxide, more particularly, about 5275 P. P. M. As previously noted, concentrations of this magnitude are to be avoided because of their destructive action with respect to the mold. Concentrations up to about 5000 P. P. M. may be used to advantage, but where such high concentrations are used it may frequently be found desirable to use a treating time of not over about 3 minutes.

As illustrated in the foregoing examples, the concentration of chlorine dioxide is not particularly critical so long as it is maintained within the specified limits. Thus the yields of Examples 2 and 3 were substantially identical at the end of the 24- and 48-hour periods. Also, as long as the concentration is maintained within the specified limits the time of exposure of the culture broth to the chlorine dioxide does not appear to be particularly critical, but a period of about 3 to 5 minutes is generally advantageous.

The treatment is preferably carried out at the beginning of the inoculation period and the effect thereof persists over a considerable period, say 24 to 48 hours. As previously noted, if the incubation period is to be further prolonged, the treatment may be repeated.

The air supplied to the culture during the incubation period is with advantage sterilized and filtered, as in conventional practice.

In addition to increasing the normal yield of penicillin, the invention has the further advantage of reducing the probability that a batch of culture will go bad and result in an abnormally low yield.

The present invention is also applicable to the culture of other molds and micro-organisms to promote the growth of a preferred strain.

I claim:

1. In the culture of penicillium molds for the production of penicillin, the improvement which comprises treating the culture medium inoculated with the penicillium mold with chlorine dioxide diluted with an inert gas to a concentration within the range of about 500 to 5000 P. P. M.

2. In the culture of penicillium molds for the production of penicillin, the improvement which comprises treating the culture medium inoculated with the penicillium mold with chlorine dioxide diluted with an inert gas to a concentration within the range of about 1000 to 4000 P. P. M. for a period of about 3 to 5 minutes.

3. In the culture of penicillium molds for the production of penicillin, the improvement which comprises treating the culture medium inoculated with the penicillium mold, in the early stages of the incubation period, with chlorine dioxide diluted with an inert gas to a concentration within the range of about 500 to 5000 P. P. M.

4. In the culture of penicillium molds for the production of penicillin, the improvement which comprises treating the culture medium inoculated with penicillium mold, in the early stages of the incubation period, with chlorine dioxide diluted with an inert gas to a concentration within the range of about 500 to 5000 P. P. M. for a period of about 3 to 5 minutes.

5. In the culture of penicillium molds for the production of penicillin, the improvement which comprises treating the culture medium inoculated with the penicillium mold, in the early stages of the incubation period, with chlorine dioxide diluted with air to a concentration within the range of about 500 to 5000 P. P. M. for a period of about 3 to 5 minutes.

6. In the culture of penicillium molds for the production of penicillin, in an enclosed chamber to which air is supplied over the surface of the culture medium, the improvement which comprises admixing chlorine dioxide with the air in the early stages of the incubation period in proportions within the range of about 500 to 5000 P. P. M.

7. In the culture of penicillium molds for the production of penicillin in an enclosed chamber to which air is supplied over the surface of the culture medium, the improvement which comprises admixing chlorine dioxide with the air in the early stages of the incubation period in proportions within the range of about 500 to 5000 P. P. M. and over a period of about 3 to 5 minutes.

ERIC R. WOODWARD.

REFERENCES CITED

The following references are of record in the file of this patent:

UNITED STATES PATENTS

| Number | Name | Date |
| --- | --- | --- |
| 1,727,223 | van Loon | Sept. 3, 1939 |

OTHER REFERENCES

Shimwell, "Penicillin," Jr. Institute of Brewing, Sept.-Oct. 1944, page 242.

Penicillin Research Progress Report No. 7, June 10, 1944, page 1, University of Wisconsin.

McCarthy, Chemical Abstracts, vol. 38, 1944, page 2774.